United States Patent
Yamada (10) Patent No.: US 12,393,389 B2
(45) Date of Patent: Aug. 19, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Toshifumi Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 573 days.

(21) Appl. No.: 17/579,600

(22) Filed: Jan. 20, 2022

(65) Prior Publication Data
US 2023/0099137 A1 Mar. 30, 2023

(30) Foreign Application Priority Data
Sep. 24, 2021 (JP) ................. 2021-155118

(51) Int. Cl.
G06F 3/14 (2006.01)
G06F 9/451 (2018.01)
G06F 16/16 (2019.01)
G06F 16/176 (2019.01)
G06F 16/93 (2019.01)
H04L 65/1083 (2022.01)
H04L 65/401 (2022.01)

(52) U.S. Cl.
CPC ............ G06F 3/1454 (2013.01); G06F 9/452 (2018.02); G06F 16/16 (2019.01); G06F 16/176 (2019.01); G06F 16/93 (2019.01); H04L 65/1083 (2013.01); H04L 65/4015 (2013.01)

(58) Field of Classification Search
CPC ............ H04L 65/1083; H04L 65/4015; H04L 65/403; G06F 16/93; G06F 3/1454; G06F 9/452; G06F 16/16; G06F 16/176
See application file for complete search history.

(56) References Cited

U.S. PATENT DOCUMENTS

| 12,081,599 | B1* | 9/2024 | Paiuk ................... H04L 65/1089 |
| 2015/0149929 | A1* | 5/2015 | Shepherd ............. H04L 12/1822 715/753 |
| 2016/0277454 | A1* | 9/2016 | Sugishita ............ H04L 65/4038 |

(Continued)

FOREIGN PATENT DOCUMENTS

| JP | 2016110486 | 6/2016 |
| JP | 6163475 | 7/2017 |

(Continued)

OTHER PUBLICATIONS

"Notice of Reasons for Refusal of Japan Counterpart Application", issued on Apr. 22, 2025, with English translation thereof, p. 1-p. 5.

Primary Examiner — Doon Y Chow
Assistant Examiner — Dennis Chow
(74) Attorney, Agent, or Firm — JCIPRNET (57) ABSTRACT

An information processing apparatus includes a processor configured to: in a case where a screen displayed on a display of a first device is displayed on a display of a second device different from the first device, receive a designation of a file to be displayed on a virtual screen different from the screen; and display the virtual screen on which the designated file is displayed, on the display of the second device.

19 Claims, 7 Drawing Sheets

(56) References Cited

U.S. PATENT DOCUMENTS

| | | | |
|---|---|---|---|
| 2017/0134430 A1* | 5/2017 | Feng | H04L 63/1425 |
| 2018/0330112 A1* | 11/2018 | Racz | H04N 21/44012 |
| 2020/0249902 A1 | 8/2020 | Taguchi | |
| 2021/0320953 A1* | 10/2021 | Sexauer | H04L 65/1069 |
| 2022/0230267 A1* | 7/2022 | Mei | H04L 65/1089 |
| 2022/0309183 A1* | 9/2022 | Jose | G06F 21/6245 |
| 2022/0368738 A1* | 11/2022 | Wu | H04N 5/775 |
| 2024/0036801 A1* | 2/2024 | Sekine | H04L 67/00 |

FOREIGN PATENT DOCUMENTS

| | | |
|---|---|---|
| JP | 2017220131 | 12/2017 |
| JP | 2020123286 | 8/2020 |
| JP | 6802477 | 12/2020 |

* cited by examiner

FIG. 10

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2021-155118 filed Sep. 24, 2021.

BACKGROUND (i) Technical Field

The present invention relates to an information processing apparatus, a non-transitory computer readable medium storing a program, and an information processing method.

(ii) Related Art

In a service such as an online conference service in which information is transmitted and received between a plurality of users, a participant of the service may share the screen of a device (for example, a personal computer) used by the participant with another participant.

JP6802477B discloses a system that identifies an active window and causes a plurality of client terminals to share an image of the active window.

JP6163475B discloses a system that causes a user to check a screen to be shared in advance.

SUMMARY

Aspects of non-limiting embodiments of the present disclosure relate to an information processing apparatus, a non-transitory computer readable medium storing a program, and an information processing method for preventing sharing of information that is not to be shared, in a case where a screen displayed on a display of a device is displayed on displays of other devices to share the screen between a plurality of users.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: in a case where a screen displayed on a display of a first device is displayed on a display of a second device different from the first device, receive a designation of a file to be displayed on a virtual screen different from the screen; and display the virtual screen on which the designated file is displayed, on the display of the second device.

BRIEF DESCRIPTION OF THE DRAWINGS

Exemplary embodiment(s) of the present invention will be described in detail based on the following figures, wherein.

DETAILED DESCRIPTION

Figure 1:
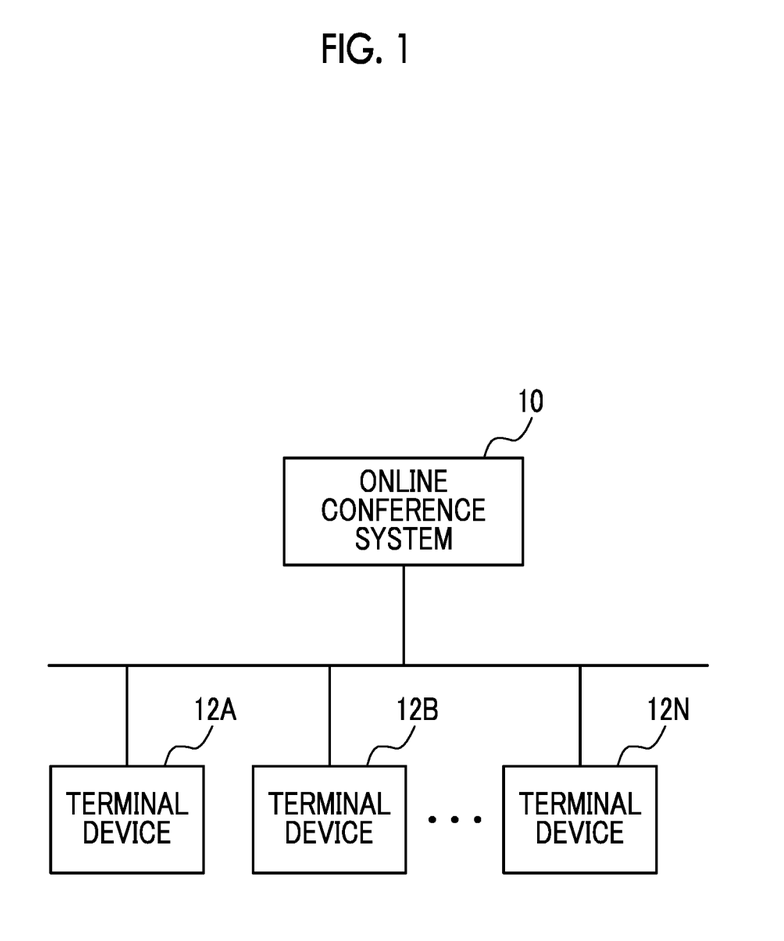
FIG. 1 is a block diagram illustrating a configuration of an information processing system.

An information processing system according to an exemplary embodiment will be described with reference to FIG. 1. FIG. 1 illustrates an example of a configuration of the information processing system according to the exemplary embodiment.

The information processing system according to the exemplary embodiment includes an online conference system 10 and N (N is an integer of 1 or more) terminal devices, as an example. In the example illustrated in FIG. 1, the information processing system includes terminal devices 12A, 12B, . . . , and 12N. In a case where it is not necessary to distinguish the terminal devices 12A, 12B, . . . , and 12N from each other, the terminal devices are referred to as a "terminal device 12" below.

The online conference system 10 and the terminal device 12 have a function of communicating with other devices. The communication may be a wired communication using a cable or a wireless communication. A wireless communication includes, for example, a short-range wireless communication, Wi-Fi (registered trademark), and the like. The short-range wireless communication includes, for example, Bluetooth (registered trademark), a radio frequency identifier (RFID), and the like. Each of the devices may communicate with another device via a communication path such as a local area network (LAN) or the Internet.

The online conference system 10 provides a service that transmits and receives information between a plurality of users.

The information transmitted and received in the service indicates, for example, an image, a moving image, a sound, a text, a symbol or a code other than the text, or a combination of at least two of the above types. Information other than the above types of information may be transmitted and received. Transmitting and receiving information means transmitting information and receiving information.

The service is, for example, a service that provides an online conference. In the online conference, information such as sounds, images, and moving images is transmitted and received between a plurality of users. The online conference may also be referred to as a web conference, a remote conference, a video conference, and the like. The service may be a service that provides a social networking service (SNS). It is assumed that the service provided by the online conference system 10 will be referred to as an "online conference service" below. For convenience of description, the name of the service includes "conference", but, the service may be used for purposes other than the conference.

Also in this case, information such as sounds, images, and moving images is transmitted and received between a plurality of users.

The terminal device 12 is, for example, a personal computer (referred to as a "PC" below), a tablet PC, a smartphone, a portable phone, or the like.

The user uses the terminal device 12 to access the online conference system 10 and use the online conference service provided by the online conference system 10. For example, information is transmitted and received between a plurality of users in a manner that the plurality of users uses the respective terminal devices 12 to use the online conference service.

In the online conference service, for example, information is transmitted and received between a plurality of terminal devices 12. A user account for using the online conference service may be created for each user, and information may be transmitted and received between a plurality of user accounts.

For example, an address (for example, a URL) for accessing the online conference service to use the online conference service is generated by the online conference system 10. Each user can acquire the address and use the own terminal device 12 to access the acquired address. In this manner, each user can use the online conference service corresponding to the address.

For example, in a case where a user who is the organizer of an online conference uses the own terminal device 12 to request the online conference system 10 to use the online conference service, an address for accessing the online conference service is generated by the online conference system 10. In response to the request from the user, the address is transmitted from the online conference system 10 to the terminal device 12. It is considered that a user who has acquired the address transmits the address to other users who participate in the identical online conference service. Thus, each user can acquire the address, and access and participate in the identical online conference service.

Channels may be created for the online conference service, and information may be transmitted and received between a plurality of users in each channel. For example, for each channel, an address for accessing the online conference service corresponding to the channel to use the online conference service is generated by the online conference system 10. By using the terminal device 12 to access a certain address, the user can use the online conference service of the channel corresponding to the accessed address.

A service ID for using an online conference service and a password corresponding to the service ID may be generated by the online conference system 10. An online conference service corresponding to the service ID and the password may be provided for the user. The user acquires the service ID and the password corresponding to the service ID, uses the terminal device 12 to access the online conference system 10, and transmits the service ID and the password to the online conference system 10. Thus, the online conference service corresponding to the service ID and the password is provided for the user.

For each channel, a service ID for the channel and a password corresponding to the service ID may be generated by the online conference system 10, and an online conference service in a channel corresponding to the service ID and the password may be provided for the user.

In the online conference service, a function of sharing a screen (referred to as a "screen sharing function" below) is provided for the user. In a case where the screen sharing function is performed, a screen displayed on the display of a certain terminal device 12 is displayed on the display of another terminal device 12 among a plurality of terminal devices 12 using the identical online conference service (for example, the online conference service in the identical channel). Thus, the screen is shared by a plurality of users who use the identical online conference service. Information displayed on the screen (for example, an image, a moving image, and a text string) is shared by the plurality of users.

For example, in a case where the terminal devices 12A, 12B, and 12C use the identical online conference service, and the screen sharing function is performed on the screen displayed on the display of the terminal device 12A, the screen displayed on the display of the terminal device 12A is also displayed on the display of each of the terminal devices 12B and 12C. Thus, the screen is shared by the respective users of the terminal devices 12A, 12B, and 12C.

The shared screen may be a desktop screen displayed on the display of the terminal device 12, or may be a region (for example, a window) in which an operation is performed by using application software.

The desktop screen is a basic screen displayed on the display of the terminal device 12 after an operating system (OS) installed on the terminal device 12 is started. For example, an image (for example, an icon) representing a file, an image (for example, an icon) representing a folder, an image (for example, an icon) representing application software, and a region in which an operation is performed are displayed on the desktop screen. The file is, for example, image data, moving image data, sound data or document data. The folder is a place where data is stored.

As the technique for realizing an online conference, for example, Virtual Network Computing (VNC; registered trademark), NetMeeting (registered trademark) of Microsoft, Windows (registered trademark) Messenger (registered trademark), Windows (registered trademark) meeting space, Skype (registered trademark) of Skype Technologies, or Bridgit (registered trademark) of Smart Technologies may be used. The exemplary embodiment is not limited to the above techniques.

The online conference system 10 corresponds to an example of an information processing apparatus. A portion of processing performed by the online conference system 10 may be performed by the terminal device 12.

Figure 2:
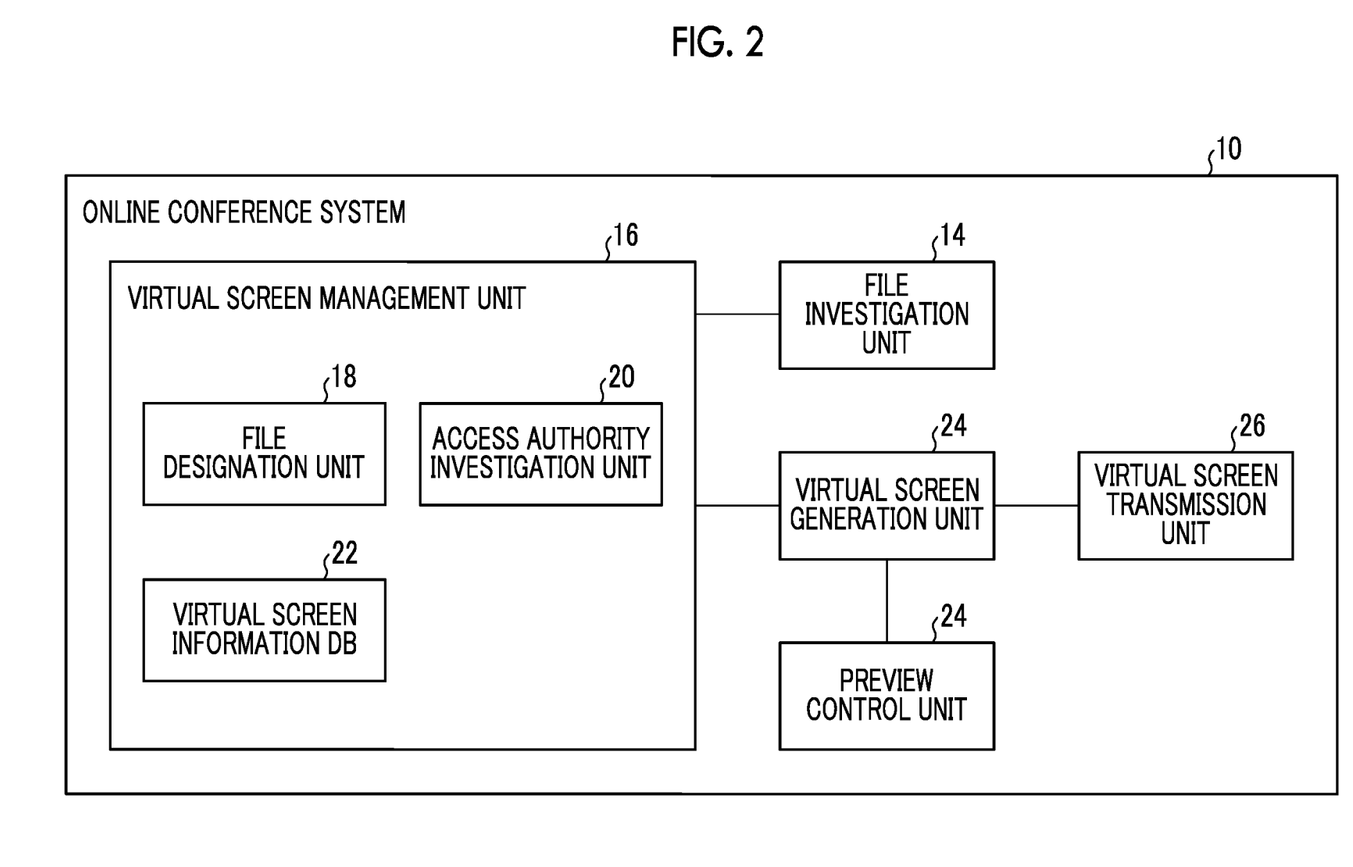
FIG. 2 is a block diagram illustrating a function of an online conference system, which is related to screen sharing.

A function of the online conference system 10, which is related to screen sharing, will be described below with reference to FIG. 2. FIG. 2 is a block diagram illustrating the function of the online conference system 10, which is related to screen sharing.

A file investigation unit 14 investigates whether or not an access authority for a file is set. The file investigation unit 14 investigates the contents of the access authority in a case where the access authority is set.

The access authority for the file may be an authority to operate the file or an authority to display an image (for example, an icon) representing the file.

Operating the file means viewing the file (for example, opening the file to display the contents of the file), editing the contents of the file (for example, changing, adding, or deleting the contents), duplicating the file, deleting the file, and the like. An authority for one or a plurality of operations among the above operations may be set on the file.

For example, in a case where an authority to view a file is set on the file, a user having the authority to view the file is permitted to view the file, and a user who does not have the authority to view the file is not permitted to view the file. The above descriptions are similarly applied to other operations.

In a case where the authority to display an image (for example, an icon) representing a file is set on the file, the image representing the file is displayed on the display of the terminal device 12 used by the user having the authority, but is not displayed on the display of the terminal device 12 used by a user who does not have the authority.

For example, a file may be associated with user identification information for identifying a user having an access authority for the file (for example, user name, user ID, and user account) or information for identifying a position having the access authority for the file, as information indicating the access authority for the file. The file investigation unit 14 specifies the content of the access authority for a file by referring to the information associated with the file.

The file to be investigated by the file investigation unit 14 is, for example, a file stored in the terminal device 12 of a user who intends to display a screen to another user and share the screen with the other user. For example, in a case where a user A intends to display a screen displayed on the display of the terminal device 12A of the user A, on the terminal device 12 of the other user and share the screen with the other user, the file investigation unit 14 investigates an access authority for a file stored in the terminal device 12A. The file investigation unit 14 may investigate the access authority for the file displayed on the display of the terminal device 12A.

The user who intends to share the screen with another user is a user who has issued an instruction to perform the screen sharing function. For example, in a case where the user A issues an instruction to perform the screen sharing function, the file investigation unit 14 investigates an access authority for a file stored in the terminal device 12A and an access authority for a file displayed on the display of the terminal device 12A.

The file investigation unit 14 investigates the access authority for the file for which a user who intends to share a screen with another user has an access authority and which is stored in a device (for example, a file server) other than the terminal device 12A. For example, the file investigation unit 14 may investigate an access authority for a file stored in a storage region which is a storage region on a cloud service or a Web service and for which the user has an authority.

The file investigation unit 14 investigates whether or not the access authority for a folder is set, and investigates the content of the access authority in a case where the access authority is set, as in the case of the file. The investigation is identical to the investigation on a file.

A virtual screen management unit 16 manages information regarding a screen shared in the online conference service. For example, the virtual screen management unit 16 manages service identification information for identifying an online conference service (for example, identification information for identifying a channel) and information related to setting of display of a screen shared in the online conference service, in association with each other.

As will be described later, in a case where the screen is shared, a virtual screen for the screen is generated and the virtual screen is shared. The virtual screen is shared, and the screen itself being a source for generating the virtual screen is not shared.

The virtual screen management unit 16 manages the service identification information for identifying the online conference service and the information related to the setting of display of the virtual screen shared in the online conference service, in association with each other. The information related to the setting of the display of the virtual screen refers to information including information for identifying an image displayed on the virtual screen (for example, an icon representing a file, and an icon representing a folder).

The virtual screen management unit 16 includes a file designation unit 18, an access authority investigation unit 20, and a virtual screen information DB (database) 22.

The file designation unit 18 causes the user to designate a file or a folder to be shared, in a case where a screen is shared in the online conference service. For example, the file designation unit 18 displays a screen for causing the user to designate a file or a folder to be shared (referred to as a "designation screen" below) on the display of the terminal device 12 used by the user. The user designates a file or a folder to be shared on the designation screen. The file or the folder designated by the user is displayed on a shared virtual screen, and thus is shared with other users.

In a case where the user designates a file or a folder to be shared, the access authority investigation unit 20 investigates whether or not the other user participating in the identical online conference service as the user (for example, an online conference service on the identical channel) has an access authority for the file or the folder. For example, the access authority investigation unit 20 investigates whether or not the other user has the access authority for the file or the folder, by referring information indicating the access authority, which is associated with the file or the folder.

In a case where a file or a folder designated by the user as a file or a folder to be shared is stored in a sharing server shared and used by a plurality of users, the access authority investigation unit 20 may investigate whether or not another user has an access authority for the file or the folder. In a case where the file or the folder is stored in the terminal device 12 of the user who intends to share the file or the folder, the access authority investigation unit 20 may not investigate whether or not another user has an access authority for the file or the folder. The file or the folder stored in the terminal device 12 of the user who intends to share the file or the folder is a file or a folder managed by the user himself/herself and are not assumed to be managed by other users. Thus, the file or the folder may be shared with other users without investigating the access authority for the file or the folder.

The virtual screen information DB 22 is a database for managing the service identification information for identifying an online conference service (for example, identification information for identifying a channel) and information related to setting of display of a virtual screen shared in the online conference service in association with each other. The virtual screen management unit 16 registers and manages the service identification information and the information related to the setting of the display of the virtual screen in the virtual screen information DB 22 in association with each other.

For example, in a case where using the online conference service registered in the virtual screen information DB 22 is ended, and then the identical online conference service is used again (for example, the online conference service in the identical channel is used again), the virtual screen associated with the online conference service is displayed on the display of the terminal device 12 of a user who uses the online conference service, in accordance with the setting of the display. Specifically, an image displayed on the virtual screen (for example, an icon representing a file or an icon representing a folder) is displayed on the display of the terminal device 12. Thus, in a case where the identical online conference service is used again, the virtual screen associated with the online conference service is reproduced on the display of the terminal device 12.

In a case where a screen is shared in an online conference service, a virtual screen generation unit 24 receives a file or a folder designated by the user as a file or a folder to be shared, and generates a virtual screen on which the designated file or folder is displayed. The virtual screen is a screen different from the screen displayed on the display of the terminal device 12, and a file or a folder which is not designated by the user is not displayed on the virtual screen. That is, regarding files and folders, only the file or the folder designated by the user is displayed on the virtual screen.

The user designates a file or a folder to be displayed on the virtual screen on the designation screen described above. That is, the designation screen is a screen for designating a file or a folder to be displayed on the virtual screen.

For example, in a case where the user uses the terminal device 12 to designate a screen to be shared and issue an instruction to perform the screen sharing function, the virtual screen generation unit 24 generates a virtual screen for the screen designated by the user. The virtual screen generation unit 24 may generate a virtual screen, and then issue an instruction to perform the screen sharing function. The virtual screen generation unit 24 displays a file or a folder designated by the user, on the virtual screen.

For example, in a case where the user designates a desktop screen displayed on the display of the terminal device 12 used by the user as the screen to be shared, a file or a folder itself displayed on the desktop screen are not shared. A virtual desktop screen for the desktop screen is generated, and the virtual desktop screen is shared. The file or the folder designated by the user is displayed on the virtual desktop screen. Thus, the file or the folder displayed on the virtual desktop screen is shared.

The virtual screen generation unit 24 may generate a virtual screen for the shared screen by duplicating the shared screen. In this case, the virtual screen generation unit 24 generates a virtual screen having the attributes of the screen as the source of duplication. The attributes of the screen mean an image displayed on the background of the screen, the color of the background, the pattern of the background, and the like. An image displayed on the background of a screen as the source of duplication, the color of the background, the pattern of the background, and the like are reproduced on the virtual screen having the identical attributes as the screen as the source of duplication.

For example, in a case where the shared screen is a desktop screen, the virtual screen generation unit 24 generates a virtual desktop screen having the identical attributes as the desktop screen by duplicating the desktop screen. An image displayed on the background of a desktop screen as the source of duplication, the color of the background, the pattern of the background, and the like are reproduced on the virtual desktop screen.

In a case where the virtual screen (for example, the virtual desktop screen) is generated, the service identification information for identifying the online conference service in which the virtual screen is shared and the information related to the setting of the display of the virtual screen are registered in the virtual screen information DB 22 in association with each other. For example, information for identifying an image displayed on the virtual desktop screen (for example, an icon representing a file or an icon representing a folder) is registered in the virtual screen information DB 22 in association with the service identification information for identifying the online conference service. In a case where the online conference service registered in the virtual screen information DB 22 is used again, the virtual screen associated with the online conference service is displayed on the display of the terminal device 12 in accordance with the setting of the display.

A virtual screen transmission unit 26 transmits the virtual screen generated by the virtual screen generation unit 24 to the terminal device 12 of the other user participating in the online conference service, and causes the virtual screen to be displayed on the display of the terminal device 12 of the other user. The virtual screen is displayed on the display of the terminal device 12 as a transmission destination, and the file or the folder displayed on the virtual screen is also displayed.

A preview control unit 28 causes the virtual screen to be displayed on the display of the terminal device 12 of the user who intends to share the screen, before the virtual screen is transmitted to the terminal device 12 of another user. Then, in a case where the user permits sharing of the virtual screen, the virtual screen transmission unit 26 transmits the virtual screen to the terminal device 12 of another user.

Although not illustrated in FIG. 2, the online conference system 10 has a function of providing an online conference service. For example, the online conference system 10 provides a different online conference service for each channel.

Figure 3:
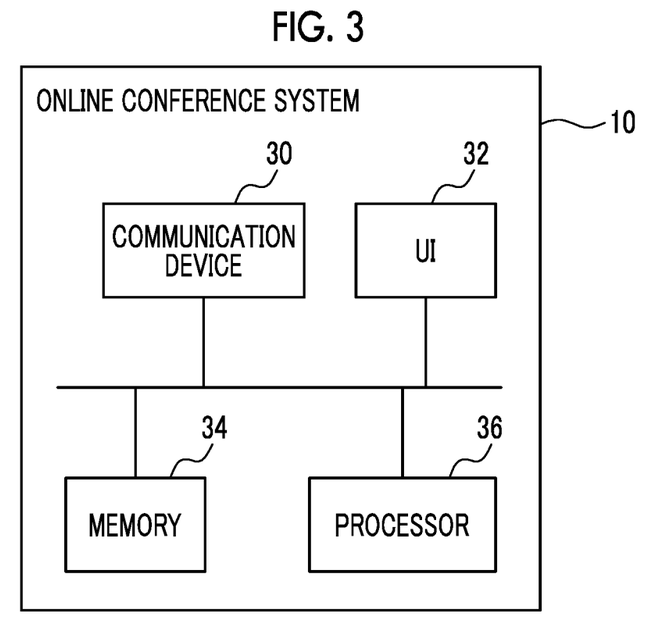
FIG. 3 is a block diagram illustrating a hardware configuration of the online conference system.

A hardware configuration of the online conference system 10 will be described below with reference to FIG. 3. FIG. 3 illustrates an example of the hardware configuration of the online conference system 10.

The online conference system 10 includes, for example, a communication device 30, a UI 32, a memory 34, and a processor 36.

The communication device 30 is a communication interface having a communication chip, a communication circuit, and the like. The communication device 30 has a function of transmitting information to another device and a function of receiving information from the other device. The communication device 30 may have a wireless communication function or a wired communication function.

The UI 32 is a user interface and includes a display and an operation device. The display is a liquid crystal display, an EL display, or the like. The operation device is a keyboard, a mouse, an input key, an operation panel, or the like. The UI 32 may be a UI such as a touch panel having both a display and an operation device. The UI 32 may include a microphone and a speaker.

The memory 34 is a device that forms one or a plurality of storage regions for storing data. Examples of the memory 34 include a hard disk drive (HDD), a solid state drive (SSD), various types of memories (for example, RAM, DRAM, and ROM), other storage devices (for example, optical disk), and a combination thereof. The online conference system 10 includes one or a plurality of memories 34.

The processor 36 is configured to control the operation of each unit of the online conference system 10. The processor 36 may include a memory. Each function illustrated in FIG. 2 is implemented by the processor 36.

Figure 4:
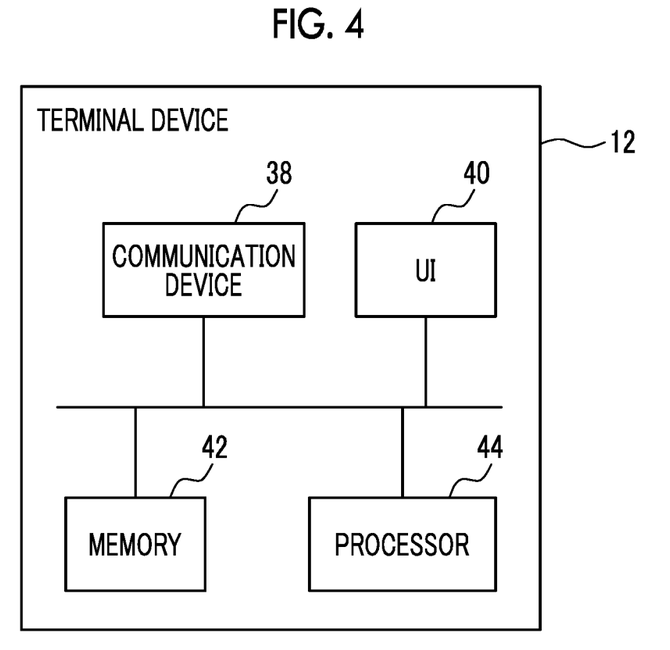
FIG. 4 is a block diagram illustrating a hardware configuration of a terminal device.

A hardware configuration of the terminal device 12 will be described below with reference to FIG. 4. FIG. 4 illustrates an example of the hardware configuration of the terminal device 12.

The terminal device 12 includes, for example, a communication device 38, a UI 40, a memory 42, and a processor 44.

The communication device 38 is a communication interface having a communication chip, a communication circuit, and the like. The communication device 38 has a function of transmitting information to another device and a function of receiving information transmitted from the other device. The communication device 38 may have a wireless communication function or a wired communication function.

The UI 40 is a user interface and includes a display and an operation device. The display is a liquid crystal display, an EL display, or the like. The operation device is a keyboard, a mouse, an input key, an operation panel, or the like. The UI 40 may be a UI such as a touch panel having both a display and an operation device. The UI 40 may include a microphone and a speaker.

The memory 42 is a device that forms one or a plurality of storage regions for storing data. Examples of the memory 42 include a hard disk drive (HDD), a solid state drive (SSD), various types of memories (for example, RAM, DRAM, and ROM), other storage devices (for example, optical disk), and a combination thereof. The terminal device 12 includes one or a plurality of memories 42.

The processor 44 is configured to control the operation of the units in the terminal device 12. The processor 44 may include a memory.

Figure 5:
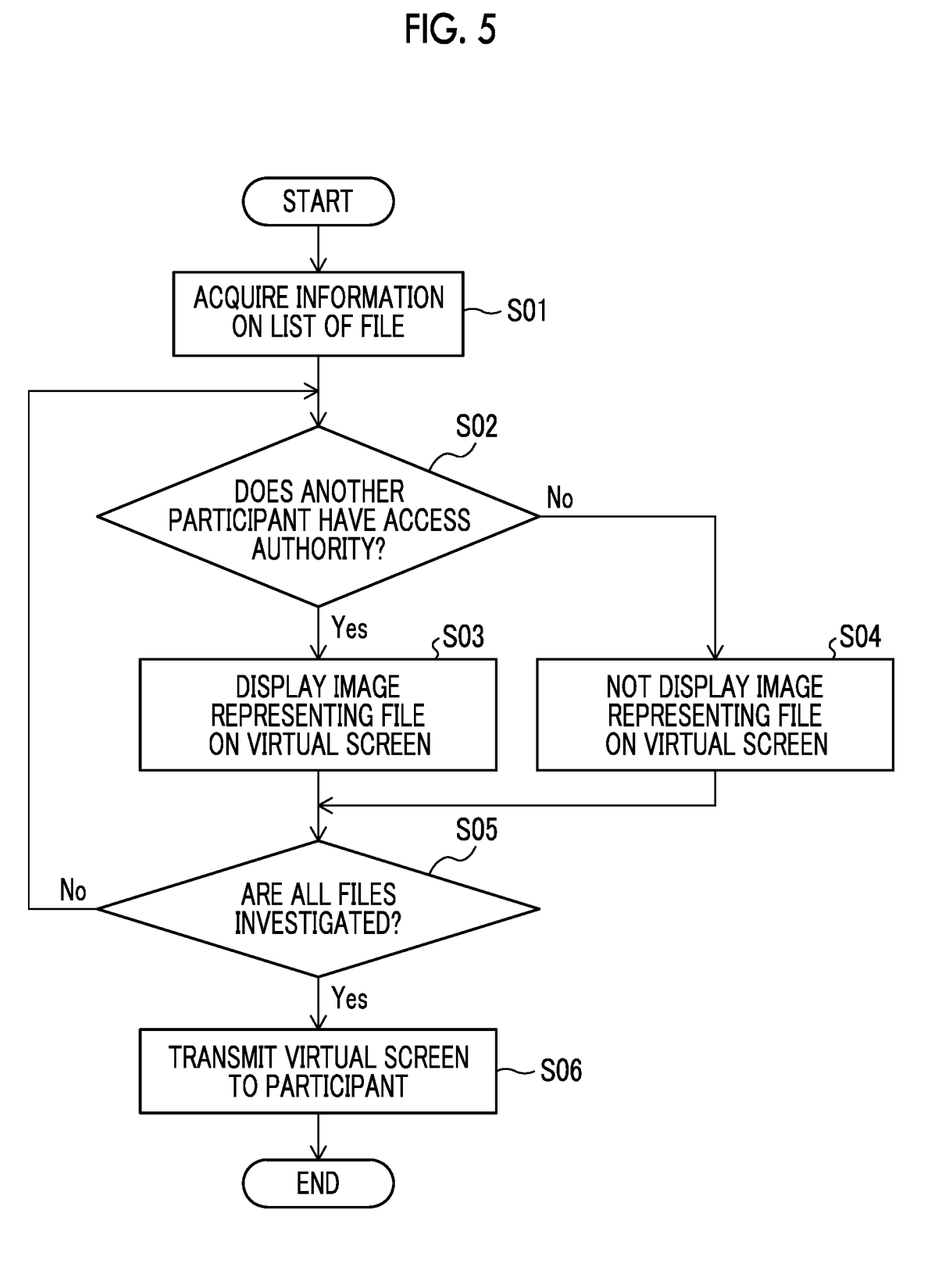
FIG. 5 is a flowchart illustrating a processing flow in a case where a screen is shared in the online conference service.

Processing in a case where the screen is shared in the online conference service will be described below with reference to FIG. 5. FIG. 5 illustrates a flowchart illustrating the processing flow.

A plurality of users use the own terminal devices 12 to participate in an online conference service in the identical channel. In a case where a user (for example, user A) participating in the online conference service uses the own terminal device 12A to designate a screen to be shared and issue an instruction to perform the screen sharing function, the file investigation unit 14 investigates an access authority for a file stored in the memory 42 of the terminal device 12A.

Then, the file designation unit 18 causes the designation screen to be displayed on the display of the terminal device 12A. The user A designates a file or a folder to be shared, on the designation screen.

In a case where the file or the folder to be shared is designated by the user A, the access authority investigation unit 20 acquires information on a list of the file or the folder designated by the user A (S01).

Then, the access authority investigation unit 20 investigates whether or not another user participating in the identical online conference service as the user A has the access authority for the file or the folder designated by the user A (S02).

In a case where another user (that is, another participant) participating in the identical online conference service as the user A has the access authority for the file or the folder designated by the user A (S02, Yes), the virtual screen generation unit 24 generates a virtual screen for the screen to be shared, and displays an image (for example, an icon) representing the file or the folder designated by the user A, on the virtual screen (S03).

For example, in a case where all the other users have access authorities for the file or the folder designated by the user A, the virtual screen generation unit 24 displays an image representing the file or the folder designated by the user A, on the generated virtual screen.

In a case where another user participating in the identical online conference service as the user A does not have the access authority for the file or the folder designated by the user A (S02, No), the virtual screen generation unit 24 generates a virtual screen for the screen to be shared, and does not display the image (for example, the icon) representing the file or the folder designated by the user A, on the virtual screen (S04).

For example, in a case where there is a user who does not have the access authority for the file or the folder designated by the user A among the other users (for example, in a case where there is even one user who does not have the access authority), the virtual screen generation unit 24 does not display the image representing the file or the folder designated by the user A, on the generated virtual screen.

In a case where a plurality of files or a plurality of folders are designated by the user A, the access authority investigation unit 20 investigates whether or not another user has an access authority for each of the files and each of the folders (S05). The virtual screen generation unit 24 displays or does not display images representing the files or the folders on the virtual screen, depending on whether or not the corresponding user has an access authority, for each of the files and each of the folders. For example, the file or the folder for which all the other users have access authorities is displayed on the virtual screen, and the file or the folder for which even one user does not have an access authority is not displayed on the virtual screen.

In a case where all files or folders designated by the user A are investigated (S05, Yes), the virtual screen transmission unit 26 transmits the virtual screen to the terminal device 12 of the other user, and causes the virtual screen to be displayed on the display of the terminal device 12 of the other user (S06). Thus, the virtual screen is shared between the user A and the other user. In a case where a file or a folder is displayed on the virtual screen, the displayed file or folder is shared between the user A and the other user.

The virtual screen may be displayed on the display of the terminal device 12A of the user A for preview before the virtual screen is transmitted to the terminal device 12 of another user. In a case where the user A issues an instruction to transmit the virtual screen, the virtual screen transmission unit 26 transmits the virtual screen to the terminal device 12 of the other user. In a case where the user A does not issue the instruction to transmit the virtual screen, the virtual screen transmission unit 26 does not transmit the virtual screen to the terminal device 12 of the other user.

In a case where the investigation of all the files or folders designated by the user A is not completed (S05, No), the process proceeds to Step S02. The processes of Steps S02 to S04 are executed until the investigation of all files and folders is completed.

The exemplary embodiment will be described below in detail with reference to specific examples.

Figure 6:
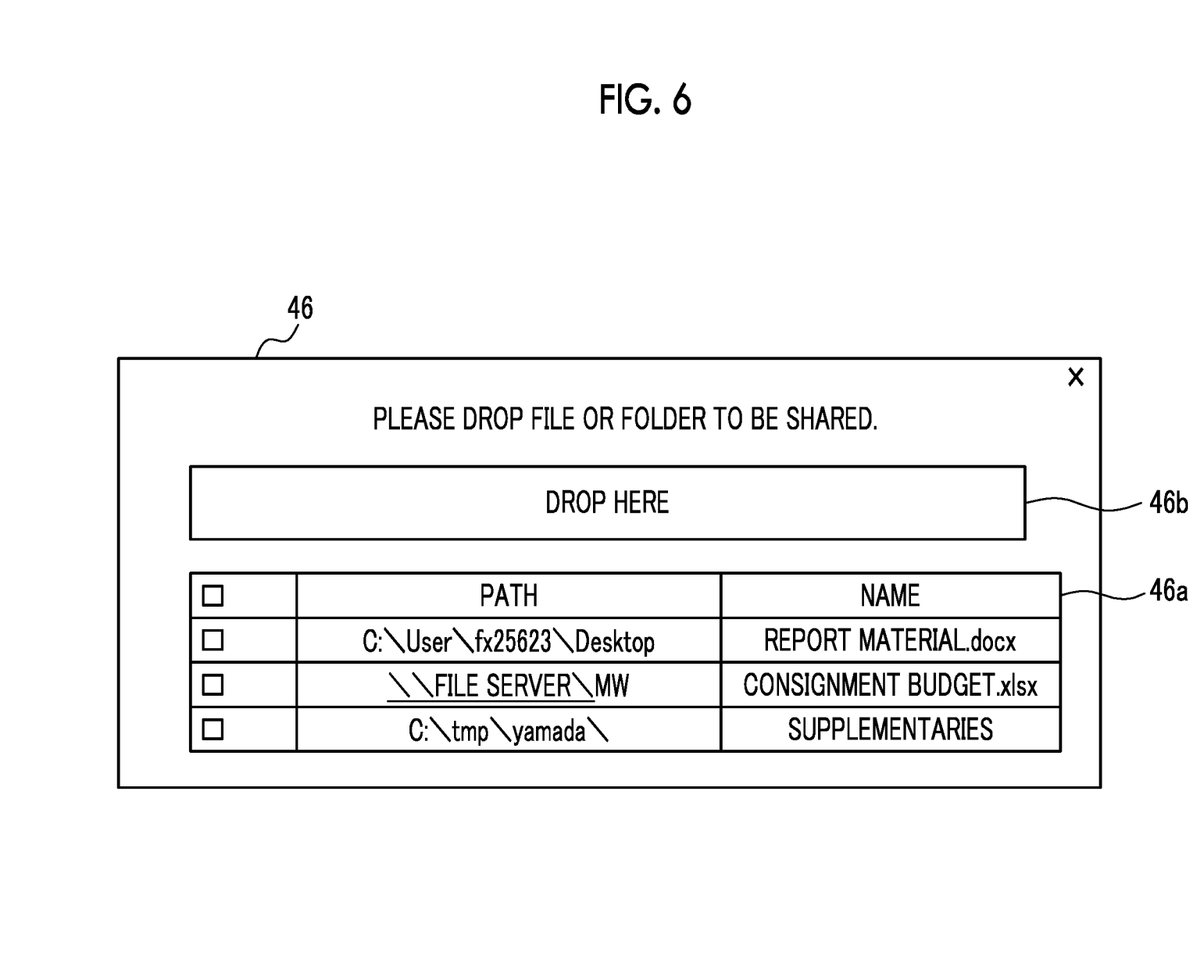
FIG. 6 is a diagram illustrating a screen for designating a file to be shared.

The designation screen will be described with reference to FIG. 6. FIG. 6 illustrates a designation screen 46. In a case where the user (for example, user A) participating in the online conference service issues an instruction to perform the screen sharing function, the processor 36 of the online conference system 10 displays the designation screen 46 on the display of the terminal device 12A of the user A. For example, in a case where an image (for example, an icon) representing the screen sharing function is displayed on the display of the terminal device 12A, and the user A presses on the image, the file designation unit 18 causes the designation screen 46 to be displayed on the display of the terminal device 12A.

A list 46a of files or folders as candidates for a sharing target is displayed on the designation screen 46. In the list 46a, for example, files and folders for which the user A has an access authority are displayed. The file for which the user A has the access authority may be a file stored in the terminal device 12A of the user A or a file stored in the sharing server. The folder for which the user A has the access authority may be a folder formed in the terminal device 12A or a folder formed in the sharing server.

In the list 46a, a path (that is, an address) representing a place where the file or the folder is stored and the name of the file or the folder are displayed in association with each other.

A region 46b in which the file or the folder to be shared is dropped is displayed on the designation screen 46. In a case where the user designates the file or the folder included in the list 46a, and the designated file or folder is dragged and dropped in the region 46b, the file or folder dropped in the region 46b is designated as the file or the folder to be shared. The access authority investigation unit 20 investigates whether or not another user participating in the identical online conference service as the user A has the access authority for the file or the folder designated by the user A.

The designation screen 46 illustrated in FIG. 6 is just an example. A file or a folder to be shared may be designated by a designation method other than the designation method using the designation screen 46.

Figure 7:
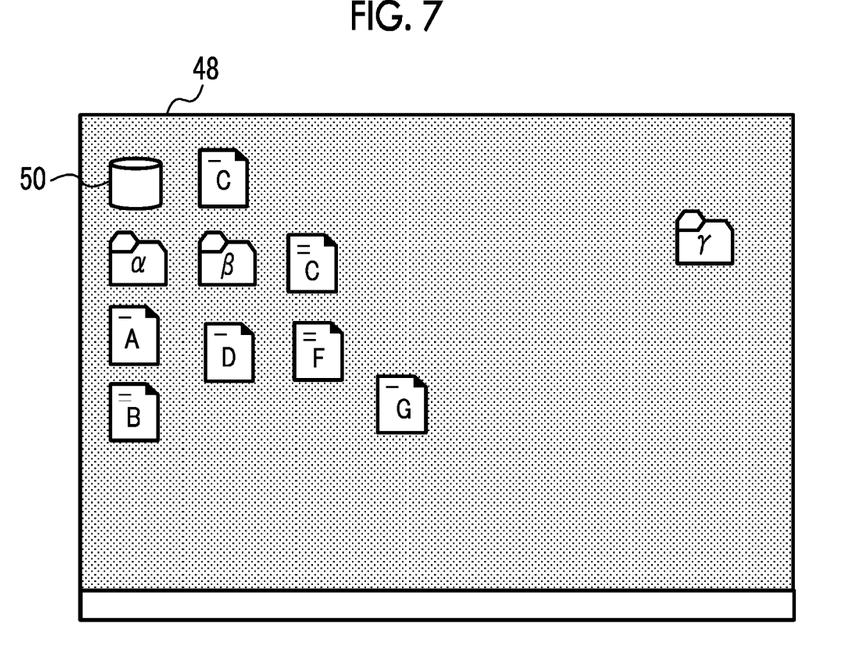
FIG. 7 is a diagram illustrating a desktop screen.

The screen displayed on the display of the terminal device 12 will be described below with reference to FIG. 7. FIG. 7 illustrates a desktop screen 48.

In the following, it is assumed that the users A, B, and C use the own terminal devices 12 to participate in the identical online conference service (for example, an online conference service in the identical channel) and use the identical online conference service. The user A uses the terminal device 12A, the user B uses the terminal device 12B, and the user C uses the terminal device 12C.

The desktop screen 48 is a desktop screen that is actually displayed on the display of the terminal device 12A of the user A participating in the online conference service, and the desktop screen 48 is not a virtual desktop screen.

An image (for example, an icon) representing each of files A to G and an image (for example, an icon) representing each of folders a to y are displayed on the desktop screen 48. An image (for example, an icon) representing a place 50 (for example, a trash can) in which the deleted file is stored is displayed on the desktop screen 48.

Figure 8:
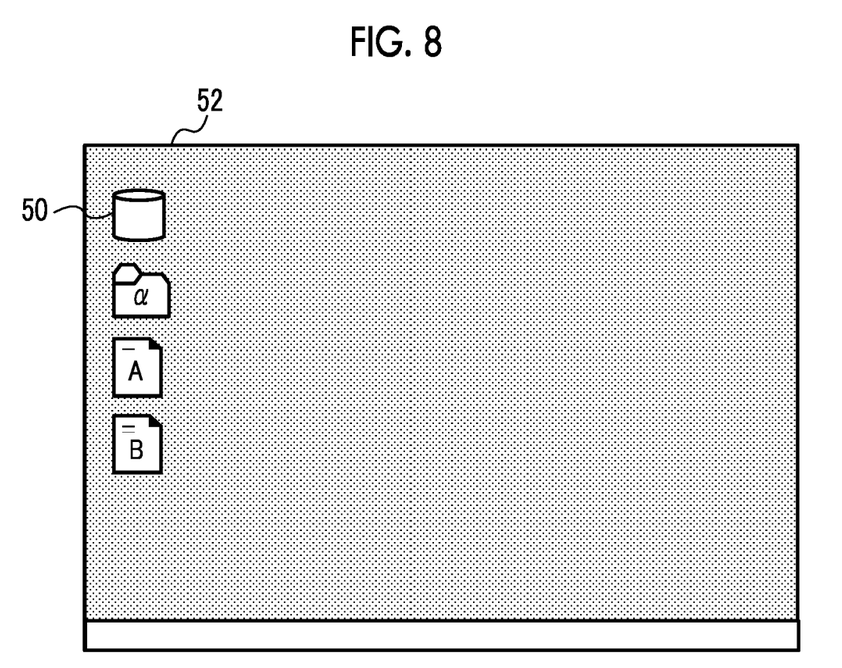
FIG. 8 is a diagram illustrating a virtual desktop screen.

The virtual desktop screen will be described with reference to FIG. 8. FIG. 8 illustrates a virtual desktop screen 52. The virtual desktop screen 52 is a virtual screen generated based on the desktop screen 48 illustrated in FIG. 7. For example, the virtual desktop screen 52 is generated by duplicating the desktop screen 48.

Files or folders which are designated as sharing targets by the user A and for which the users B and C participating in the identical online conference service as the user A have access authorities are displayed on the virtual desktop screen 52. In the example illustrated in FIG. 8, the files A and B and the folder a are designated as the sharing target by the user A, and the other uses B and C participating in the identical online conference service as the user A have the access authorities for the files A and B and the folder a. Therefore, an image representing each of the files A and B and the folder a is displayed on the virtual desktop screen 52.

For example, in a case where all the other users being the users B and C have the access authorities for the files A and B and the folder a, the image representing each of the files A and B and the folder a is displayed on the virtual desktop screen 52.

In a case where there is the user who does not have the access authority for the files and the folder designated by the user A (for example, in a case where there is even one user who does not have the access authority), the image representing each of the files A and B and the folder a is not displayed on the virtual desktop screen 52. In the example illustrated in FIG. 8, all the users B and C have the access authorities for the files A and B and the folder a.

For example, even in a case where the user A designates the file C as the file to be shared, the file C is not displayed on the virtual desktop screen 52 in a case where there is the user who does not have the access authority for the file C among the users B and C.

The virtual desktop screen 52 is transmitted to the terminal device 12B of the user B and the terminal device 12C of the user C, and is displayed on the respective displays of the terminal devices 12B and 12C. Thus, the virtual desktop screen 52 and the images displayed on the virtual desktop screen 52 are shared with the users B and C.

The original desktop screen 48 is displayed on the display of the terminal device 12A of the user A who has issued an instruction of sharing (see FIG. 7). The virtual desktop screen 52 may be reduced and displayed on the desktop screen 48 of the terminal device 12A. The original desktop screen 48 and the virtual desktop screen 52 may be switched and displayed. Alternatively, the region of the screen may be divided, and the original desktop screen 48 and the virtual desktop screen 52 may be simultaneously displayed.

The terminal device 12A corresponds to an example of a first device. Each of the terminal devices 12B and 12C corresponds to an example of a second device.

The files and folders displayed on the virtual desktop screen may be changed depending on whether or not the user has access authorities for the files and folders. For example, a virtual desktop screen on which the file or the folder designated by the user A is not displayed is displayed on the display of the terminal device 12 of the user who does not have the access authority to the designated file or folder. In addition, a virtual desktop screen on which the file or the folder designated by the user A is displayed is displayed on the display of the terminal device 12 of the user who has the access authority for the designated file or folder.

For example, it is assumed that, in a case where the user A designates the file C as the file to be shared, the user B has an access authority for the file C and the user C does not have the access authority for the file C. In this case, the virtual screen generation unit 24 generates a virtual desktop screen on which the image representing the file C is displayed, as a virtual desktop screen for the user B. In addition, the virtual screen generation unit 24 generates a virtual desktop screen on which the image representing the file C is not displayed, as a virtual desktop screen for the user C. The virtual desktop screen for the user B is transmitted to the terminal device 12B, and the virtual desktop screen for the user C is transmitted to the terminal device 12C. The virtual desktop screen on which the image representing the file C is displayed is displayed on the display of the terminal device 12B. The virtual desktop screen on which the image representing the file C is not displayed is displayed on the display of the terminal device 12C.

The virtual desktop screen 52 has the attributes of the desktop screen 48 as the generation source. Therefore, the pattern and the color of the background (for example, wallpaper) of the virtual desktop screen 52 are the identical as the pattern and the color of the background of the desktop screen 48. In addition, an image that does not have a relation with the file or folder (for example, an image associated with the trash can) is also displayed on the virtual desktop screen 52. Thus, the virtual desktop screen 52 that reproduces the desktop screen 48 is shared with the users B and C, excluding the file and the folder that are not to be shared.

Figure 9:
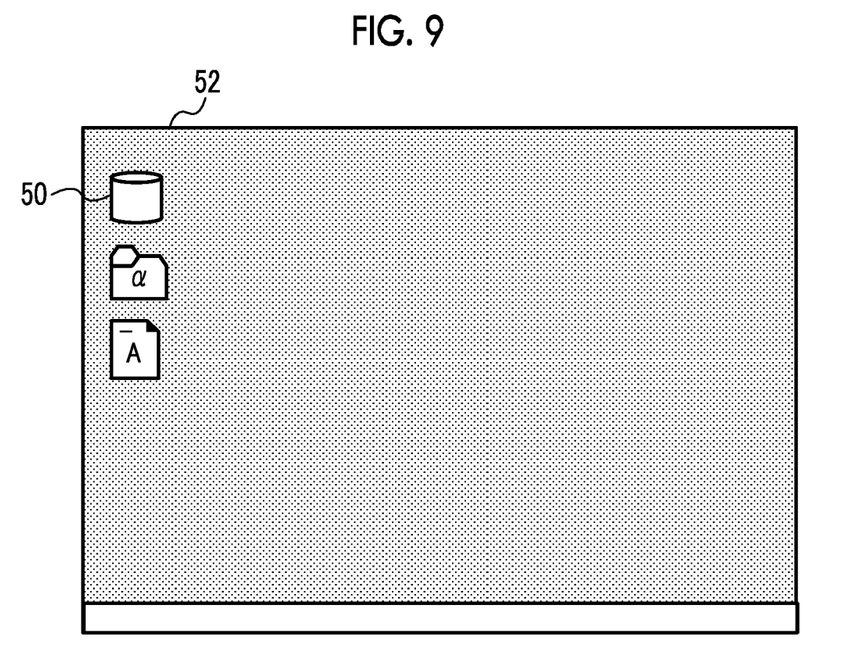
FIG. 9 is a diagram illustrating the virtual desktop screen.

In a case where the virtual desktop screen 52 illustrated in FIG. 8 is shared with the users B and C, and then, for example, a new user D who does not have the access authority for the file B uses the own terminal device 12D to participate in the identical online conference service as the users A, B, and C, the image associated with the file B is not displayed on the virtual desktop screen 52 as illustrated in FIG. 9. Since this situation corresponds to a situation in which there is even one user who does not have an access authority for the file B, the image representing the file B is not displayed. For example, the virtual desktop screen 52 on which the image representing the file B is not displayed is displayed on the respective displays of the terminal devices 12B, 12C, and 12D.

For example, in a case where the user D participates in the identical online conference service as the users A, B, and C, the virtual screen generation unit 24 generates a new virtual desktop screen 52 on which the image representing the file A and the image representing the folder a are displayed, and the image representing the file B is not displayed. The virtual screen transmission unit 26 transmits the new virtual desktop screen 52 to the terminal devices 12B, 12C, and 12D, and causes the new virtual desktop screen 52 to be displayed on the respective displays of the terminal devices 12B, 12C, and 12D.

In a case where the user D has the access authority for the file B, the image representing the file B is displayed on the virtual desktop screen 52, and the virtual desktop screen 52 on which the files A and B and the folder a are displayed is shared with the users B, C and D.

As another example, the virtual desktop screen 52 on which the image representing the file B is displayed as illustrated in FIG. 8 may be displayed on the respective displays of the terminal devices 12B and 12C, and the virtual desktop screen 52 on which the image representing the file B is not displayed as illustrated in FIG. 9 may be displayed on the display of the terminal device 12D.

Figure 10:
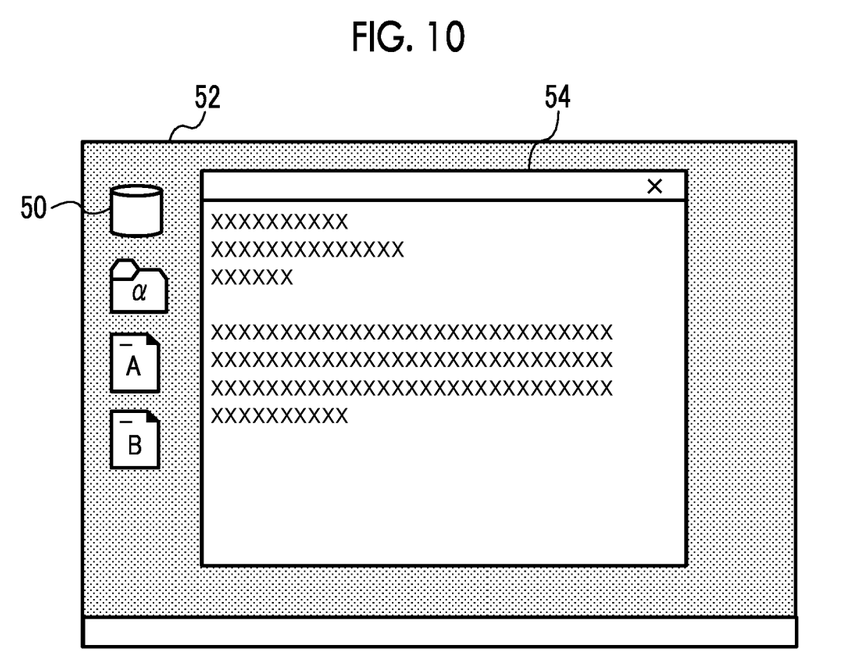
FIG. 10 is a diagram illustrating the virtual desktop screen.

In a case where a file is opened on the virtual screen and a new user participates in the identical online conference service, the virtual screen generation unit 24 may close the file and hide the contents of the file in accordance with the access authority of the new user for the file. Such processing will be described with reference to FIGS. 9 and 10. FIG. 10 illustrates the virtual desktop screen 52.

It is assumed that the users A, B, and C are participating in the identical online conference service. As described above, the users B and C have access authorities for the files A and B and the folder a.

For example, in a case where the user A gives an instruction to open the file B, the file B is opened by application software associated with the file B, and the contents 54 of the file B are displayed on the virtual desktop screen 52 as illustrated in FIG. 10. For example, in a case where the file B is a document, the contents of the document are displayed on the virtual desktop screen 52. The contents of the file B are displayed on the virtual desktop screen 52 displayed on the respective displays of the terminal devices 12B and 12C. Thus, the contents of the file B are shared among the users A, B, and C.

In this state, in a case where the user D who does not have the access authority for the file B participates in the identical online conference service as the users A, B, and C, the virtual screen generation unit 24 closes the file B and hides the contents of the file B. The virtual screen generation unit 24 generates a virtual desktop screen on which the image representing the file B is not displayed. In this case, the virtual desktop screen 52 illustrated in FIG. 9 is displayed on the respective displays of the terminal devices 12B, 12C, and 12D.

The contents 54 of the file B may be displayed on the virtual desktop screen 52 displayed on the displays of the terminal devices 12B and 12C, and the contents 54 of the file B may not be displayed on the virtual desktop screen 52 displayed on the display of the terminal device 12C.

The functions of the online conference system 10 and the terminal device 12 described above are realized by the cooperation of hardware and software as an example. For example, the processor of each device reads and executes the program stored in the memory of each device to realize the functions of each device. The program is stored in the memory via a recording medium such as a CD or a DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to: in a case where a screen displayed on a display of a first device is displayed on a display of a second device different from the first device,
        receive a designation of a file to be displayed on a virtual screen different from the screen; and
        display the virtual screen on which the designated file is displayed, on the display of the second device,
    wherein the processor is further configured to:
        display the virtual screen on which the designated file is not displayed, on a display of a device of a user who does not have an authority for the designated file; and
        display the virtual screen on which the designated file is displayed, on a display of a device of a user having the authority for the designated file.

2. The information processing apparatus according to claim 1, wherein the processor is further configured to:
    in a case where a service that transmits and receives information between a plurality of users is used, and the screen displayed on the display of the first device is displayed on the display of the second device, control display of the designated file on the virtual screen in accordance with an authority of a user participating in the service for the designated file.

3. The information processing apparatus according to claim 2, wherein the processor is further configured to:

in a case where a plurality of users participating in the service include a user who does not have an authority for the designated file, display the virtual screen on which the designated file is not displayed, on a display of a device of each of the plurality of users.

4. The information processing apparatus according to claim 3, wherein the processor is further configured to:

control the display of the designated file on the virtual screen in accordance with an authority of a new user participating in the service for the designated file.

5. The information processing apparatus according to claim 4, wherein the processor is further configured to:

in a case where the designated file is opened on the virtual screen, and a new user participates in the service, close the designated file in accordance with an authority of the new user for the designated file.

6. The information processing apparatus according to claim 3, wherein the processor is further configured to:

in a case where the designated file is opened on the virtual screen, and a new user participates in the service, close the designated file in accordance with an authority of the new user for the designated file.

7. The information processing apparatus according to claim 3, wherein the screen is a desktop screen displayed on the display of the first device, and the virtual screen is a duplicate of the desktop screen.

8. The information processing apparatus according to claim 2, wherein the processor is further configured to:

control the display of the designated file on the virtual screen in accordance with an authority of a new user participating in the service for the designated file.

9. The information processing apparatus according to claim 8, wherein the processor is further configured to:

in a case where the designated file is opened on the virtual screen, and a new user participates in the service, close the designated file in accordance with an authority of the new user for the designated file.

10. The information processing apparatus according to claim 2, wherein the processor is further configured to:

in a case where the designated file is opened on the virtual screen, and a new user participates in the service, close the designated file in accordance with an authority of the new user for the designated file.

11. The information processing apparatus according to claim 2, wherein the screen is a desktop screen displayed on the display of the first device, and the virtual screen is a duplicate of the desktop screen.

12. The information processing apparatus according to claim 1, wherein the processor is further configured to:

control the display of the designated file on the virtual screen in accordance with an authority of a new user participating in the service for the designated file.

13. The information processing apparatus according to claim 12, wherein the processor is further configured to:

in a case where the designated file is opened on the virtual screen, and a new user participates in the service, close the designated file in accordance with an authority of the new user for the designated file.

14. The information processing apparatus according to claim 1, wherein the processor is further configured to:

in a case where the designated file is opened on the virtual screen, and a new user participates in the service, close the designated file in accordance with an authority of the new user for the designated file.

15. The information processing apparatus according to claim 1, wherein the screen is a desktop screen displayed on the display of the first device, and the virtual screen is a duplicate of the desktop screen.

16. The information processing apparatus according to claim 1, wherein the screen is a desktop screen displayed on the display of the first device, and the virtual screen is a duplicate of the desktop screen.

17. The information processing apparatus according to claim 1, wherein the processor is further configured to:

display the virtual screen on both the display of the first device and the display of the second device.

18. A non-transitory computer readable medium storing a program causing a computer to operate to: in a case where a screen displayed on a display of a first device is displayed on a display of a second device different from the first device, receive a designation of a file to be displayed on a virtual screen different from the screen;

display the virtual screen on which the designated file is displayed, on the display of the second device;

display the virtual screen on which the designated file is not displayed, on a display of a device of a user who does not have an authority for the designated file; and display the virtual screen on which the designated file is displayed, on a display of a device of a user having the authority for the designated file.

19. An information processing method comprising:

in a case where a screen displayed on a display of a first device is displayed on a display of a second device different from the first device, receiving a designation of a file to be displayed on a virtual screen different from the screen;

displaying the virtual screen on which the designated file is displayed, on the display of the second device;

displaying the virtual screen on which the designated file is not displayed, on a display of a device of a user who does not have an authority for the designated file; and displaying the virtual screen on which the designated file is displayed, on a display of a device of a user having the authority for the designated file.

* * * * *